United States Patent [19]
Dini

[11] 3,938,371
[45] Feb. 17, 1976

[54] DEPTH MEASURING APPARATUS USING REFLECTED ULTRASONIC BEAMS

[75] Inventor: Mamiliano Dini, Island of Elba, Italy

[73] Assignee: European Rotogravure Association, Germany

[22] Filed: Sept. 27, 1973

[21] Appl. No.: 401,381

[30] Foreign Application Priority Data
  Oct. 3, 1972  Germany............... 7236314[U]

[52] U.S. Cl............................. 73/67.8 S; 33/125 W
[51] Int. Cl.² ................... G01B 15/00; G01N 29/00
[58] Field of Search............ 73/67.8 R, 67.8 S, 67.9, 73/71.5 US; 33/125 W

[56] References Cited
UNITED STATES PATENTS

| | | | |
|---|---|---|---|
| 2,953,017 | 9/1960 | Bincer et al. ................ | 73/67.8 S X |
| 3,299,696 | 1/1967 | Dickenson ..................... | 73/71.5 US |
| 3,612,920 | 10/1971 | Bantz............................. | 73/71.5 US |
| 3,798,961 | 3/1974 | Flambard et al............... | 73/71.5 US |

FOREIGN PATENTS OR APPLICATIONS

| | | | |
|---|---|---|---|
| 766,984 | 1/1957 | United Kingdom ............. | 73/67.8 S |

Primary Examiner—Richard C. Queisser
Assistant Examiner—John P. Beauchamp
Attorney, Agent, or Firm—Cushman, Darby & Cushman

[57] ABSTRACT

Depth measuring apparatus especially useful for measuring the depth of cells formed in a material layer, such as a rotogravure printing cylinder. An ultrasonic transmitter/receiver is adjustably mounted to a coupling element which is adjacent a surface having cells therein whose depth is to be measured. The position of the ultrasonic transmitting/receiving unit is adjustable with respect to the coupling element so as to adjust the angle at which the ultrasonic beam is impinged upon the material layer with respect to the plane of the material layer. The coupling element itself also has adjustment means associated therewith for adjusting the angle at which the ultrasonic beam is impinged on the material layer with respect to the plane of wall portions of cells formed in the material layer.

24 Claims, 2 Drawing Figures

3,938,371

DEPTH MEASURING APPARATUS USING REFLECTED ULTRASONIC BEAMS

CROSS-REFERENCES TO RELATED APPLICATIONS

The present invention is directed to apparatus useful in practicing methods disclosed and claimed in copending application Ser. No. 371,467, filed June 19, 1973, now Pat. No. 3,885,422 and the method disclosed in application Ser. No. 219,991, filed in 1972, now Pat. No. 3,808,878.

BACKGROUND OF THE INVENTION

This invention relates to apparatus useful in sensing the depth of cellular pits or cells formed in a surface. The apparatus is particularly useful in the preparation of rotogravure cylinders.

In the production of rotogravure cylinders to be used in an intaglio printing process, a plurality of closely adjacently spaced cells or cup-shaped pits are formed in the cylinder surface, either by electromechanical means or by means of an etching process. During the printing operation, the cells formed receive the printing ink and establish varying intensities of color shade depending upon their volume, so that a desired pattern including respective variations of color tone intensity can be produced. Thus, the intensity of the print depends upon the quantity of printing ink contained in the individual cells, i.e. on the section area and/or the depth of the cells. Therefore, it is of principle importance in the production of the rotogravure cylinders that the cells be formed to have a desired depth and thus provide a faithful color reproduction of the image of an original.

It has heretofore been customary to sense and inspect engraved cells or etched cells with respect to their depth or their volume by means of a microscope. Furthermore, it is possible to scan and record the profile of a predetermined number of cells by using profile recorders and with the aid of a special stylus. The values obtained in this way can then be compared with an empirically established scale of values in order to determine whether the examined cells have the necessary depth. However, these measuring methods are extremely cumbersome and time-consuming.

There is disclosed and claimed in copending application Ser. No. 371,467, filed June 19, 1973, and application Ser. No. 219,991, filed in 1972, an improved method for determining the depth of cells formed in a material surface. In accordance with the method, cells of an individual region are scanned successively by a bundle of an ultrasonic beam which is projected onto the surface of the material layer in a plane perpendicular to the side walls or side wall portions of the cells and at a specific angle with respect to the surface of the material layer. A portion of the ultrasonic beam is reflected back towards a source by the side wall and bottom portions of the scanned cell regions so that the reflected portion of the ultrasonic beam is parallel to the incident beam. As explained in the above-identified copending patent applications, the intensity or amount of the reflected ultrasonic beam depends upon the size of the area of the wall of the cell and hence on the depth of the cell because with a given diameter of ultrasonic beam and with increasing wall size or depth of the cell, an increased portion of the incident ultrasonic beam is returned to the receiver and measured thereby.

SUMMARY AND OBJECTS OF THE INVENTION

Accordingly, it is an object of this invention to provide apparatus for use in ultrasonically measuring the depth of cells formed in a material surface.

It is a more specific object of this invention to provide adjustable apparatus for generating and coupling an ultrasonic beam into cells formed in a material surface whereby the amount of the ultrasonic beam reflected parallel to the incident beam is detected and used as an indication of the depth of the cell.

Briefly, in accordance with one embodiment of the invention, there is provided an ultrasonic sensing head capable of both transmitting and receiving an ultrasonic beam. The ultrasonic sensing head is adjustably mounted within a housing which is adapted to be locked relative to the material layer surface.

DESCRIPTION OF THE PREFERRED EMBODIMENTS

Figure 1:
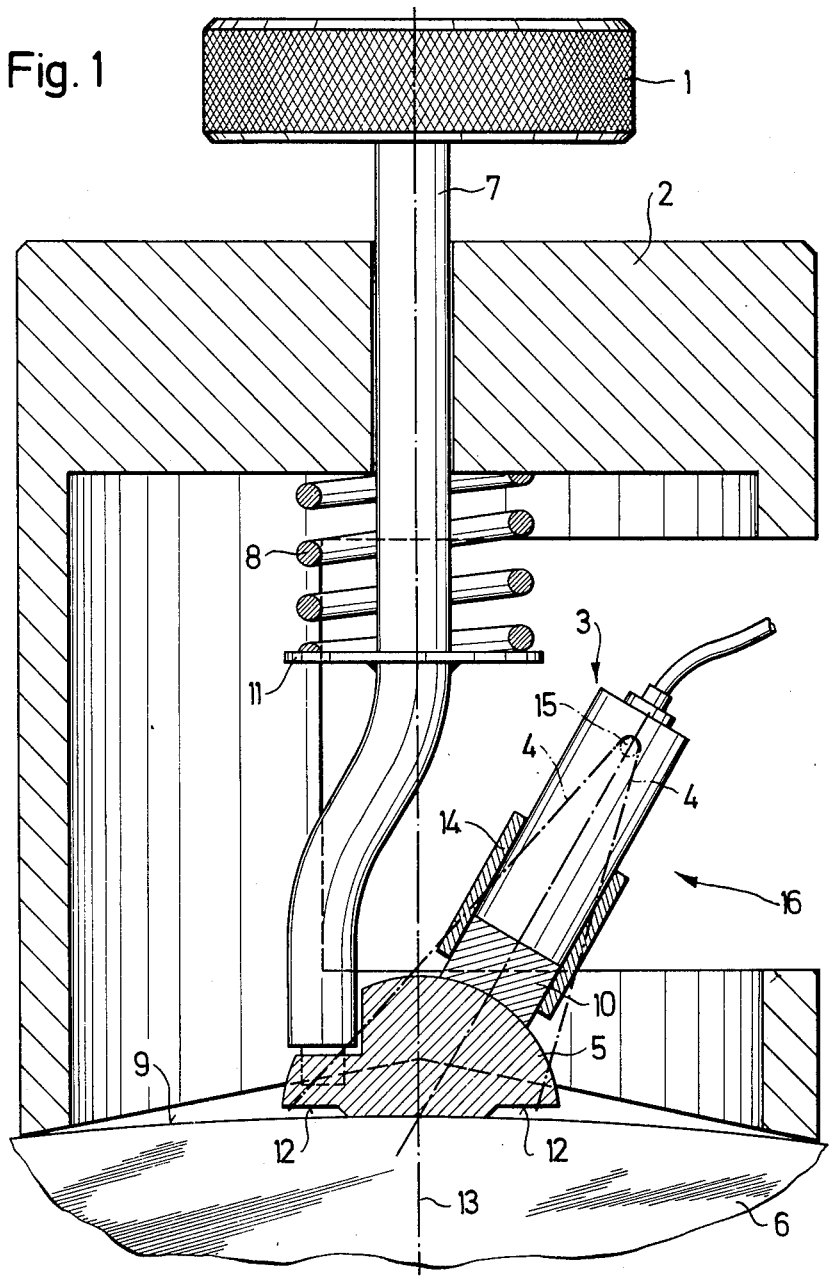
FIG. 1 is a schematic cross-sectional view of apparatus in accordance with the invention shown suitably positioned on the surface of a material layer.

FIG. 1 shows one embodiment of apparatus in accordance with the invention, which apparatus is shown mounted in fixed relative position to the surface of a material layer such as a rotogravure printing cylinder. The apparatus includes a frame or a housing 2 which, on its side opposing the printing cylinder surface 9, is provided with a lateral aperature 16 to facilitate easy actuation and handling of the measuring device, as more specifically described hereinafter. A retainer rod 7 passes through the upper portion of the housing 2, which rod carries at its upper end a gripping element, such as a knurled wheel or a knurled disc 1. Interiorally of the housing, the retainer rod 7 is provided, for example, with a welded support washer 11 some centimeters under the upper housing wall. A compression spring 8 is interposed between the support washer 11 as one abutment surface and the inner face of the upper housing wall as a second abutment surface. Under the support washer 11 the retainer rod 7 is offset or bent, which configuration, although not essential, is advantageous. A coupling element 5 is provided as shown in FIG. 1 and preferably has a partly spherical or partly cylindrical shape, such as a hemispherical shape or a semi-cylindrical shape. The coupling element 5 is suitably attached to the lower end of the retainer rod 7, preferably so as to be rotatable about the lower end of the retainer rod. As shown, the retainer rod 7 holds the coupling element 5 centered relative to a particular vertical point (centerline 13) on the material layer surface 9 or on the rotogravure cylinder 6.

An ultrasonic sensing head 3 is placed, with an intermediate lubricant layer, such as a silicone oil layer, onto the outer (i.e. spherical or cylindrical surface of the coupling element 5 with the interposition of another coupling element 10 having its contact surface exactly adapted to the outer surface of the coupling element 5. The elements 5 and 10 may be formed of any suitable material which efficiently transmits ultrasonic beams and the elements 5 and 10 should be formed of materials which have the same or substantially the same index of refraction for ultrasonic beams.

The ultrasonic measuring head may be a conventional type standard ultrasonic combined transmitter/receiver, such as those manufactured by Branson Instruments Company, Stamford, Conn. The ultrasonic beam from such a transmitter can have a diameter, for example, of approximately 12.7 mm. This ultrasonic measuring transmitter/receiver 3 is positioned or aligned in such a way that the ultrasonic beam impinges upon the base point of the vertical centerline 13 on the surface of the material layer 9. The attachment of the ultrasonic measuring head 3 on the coupling element 5 is made, on the one hand, between the other coupling element 10 which contacts the ultrasonic emission surface of the measuring head 3 by means of a socket 14, or any equivalent positively locking attachment element. In accordance with the preferred embodiment of the invention, elastic tensioning retainer elements 4, which can, for example, be rubber or neoprene strips or even tension spring elements, are anchored in appropriate recesses 12 at the lower edge of coupling element 5, which lower edge can be slightly raised relative to the contact surface of the coupling element 5 on the material layer surface 9. These tensioning retainer strips 4 pass over a stud 15 or the like on the ultrasonic measuring head, such that the ultrasonic measuring head is urged against the second coupling element 10 which, in turn, is pressed against the coupling element 5. As previously pointed out, a lubricant layer is maintained between the mating surfaces of the coupling elements 5 and 10 and can be a silicone oil composition. If desired, means such as a reservoir can be provided for continuously replenishing the lubricating oil layer.

In operation, the housing 2, in combination with the retainer rod 7 and the lower coupling element 5 attached thereto, is brought into a predetermined relative position to the material layer which, for example, is a rotogravure printing cylinder. Although not necessary, the outer lower housing edge may thereby contact the material layer surface 9. In view of the action of the compression spring 8, the lower contact or abutment surface of the coupling element 5 contacts the material layer surface 9 with a certain pressure. In accordance with a preferred embodiment, a continuously maintained lubricant layer is maintained between the lower contact or abutment surface of coupling element 5 and the surface of the material layer 9. This lubricant layer can be a silicone oil composition, for example, and suitable reservoir means may be provided for maintaining a constant supply of the lubricant. The lubricant permits the apparatus to be smoothly and easily shifted from one sensing position on the surface 9 of the rotogravure cylinder to the next sensing position.

In order to determine the depth, such as the etched depth of ink receiving cells formed in the surface of the material layer such as the rotogravure cylinder, the ultrasonic measuring head or transmitter/receiver provided with the second coupling element 10 is attached and fixed on the lower coupling element 5 in a given angular position by means of the resilient tensioning retainer elements 4. This angular position may be varied in a relatively easy manner by shifting the sensing head 3 and the coupling element 10 with respect to the coupling element 5, whereby the mutually contacting abutment surfaces of the two coupling elements 5 and 10 slide upon each other via the intermediate lubricating film. However, the tensioning retainer elements 4 retain the measuring head 3 with a sufficiently great bias force against the lower coupling element 5 that the measuring head cannot shift by itself. Accordingly, the measuring head 3 is adjusted, for example, in accordance with the directions according to the methods described in the above-mentioned copending patent applications, to a predetermined angle either relative to the centerline 13 or relative to the surface of the material layer or with respect to a tangent to the base point of the perpendicular line 13 and the surface of the material layer. In principle, this angle can be any angle between 0° and 90°. The respective limits should be avoided because it is difficult to obtain verifiable clear measuring results at these limits. On the other hand, proper results are obtained in the angular range of between 10° and 70°. For reasons of geometrical optics, which are explained in more detail in the specifications of the above-mentioned copending patent applications, an optimum yield of a measured value signal is achieved at an angle of projection of about 30° relative to the perpendicular line 13. This position corresponds approximately to the position of the measuring head as shown and illustrated in FIG. 1. Once the measuring head is adjusted to optimum values, an adjustment of the ultrasonic beams to the cells to be measured in the surface of the material layer may be effected simply by rotating the knurled wheel 1. That is, the knurled wheel 1 is rotated so as to rotate the coupling elements 5 and 10 and hence the ultrasonic sensing head 3 to the point where the ultrasonic beam impinges upon a cell in a plane which is perpendicular to the plane of the side wall portions of the cell. Maximum reflection of the ultrasonic beam by the side walls and the bottom portions of the cells will be achieved when the plane of the impinging ultrasonic beam is at 90° or perpendicular to the plane of the side walls of the cells. The lower coupling element 5 under the action of the spring 8 is always held in firm contact with the surface of the material layer 9.

Figure 2:
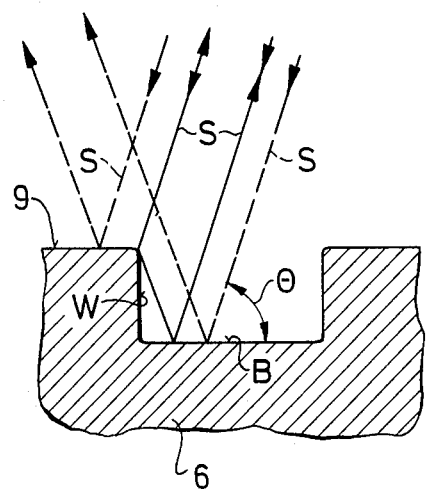
FIG. 2 is a diagrammatic cross-section of a typical cell formed in the material layer, the depth of which cell is to be measured.

As explained in the previously mentioned copending patent applications, and as can be visualized by referring to FIG. 2, the ultrasonic beam S impinges upon the material layer surface 9 at an angle $\theta$, which as explained previously, can be between 0° and 90° but, in accordance with one embodiment, is approximately 30°. Portions of the ultrasonic beam S strike the upper portion of the surface 9 and are reflected off the surface at some angle. Certain other portions of the ultrasonic beam S impinge upon the walls of the cell and are reflected to the bottom of the cell which in turn reflects the ultrasonic beam back out in a direction parallel to the incoming beam. Likewise, portions of the ultrasonic beam strike the bottom of the cell and are reflected from the bottom to the side wall and are reflected by the side wall back in a direction parallel to the incoming beam. As explained in the above-mentioned copending patent applications, the portion of the incoming ultrasonic beam which is reflected parallel to the incoming beam is proportional to the area of the wall portions W and hence proportional to the depth of the cell and detection and measurement of the reflected portions of the ultrasonic beam serve as an indication of the depth of the cell.

Although the invention has been described with reference to particular preferred embodiments, it is obvious that certain modifications can be made to these preferred embodiments by those skilled in the art without departing from the true spirit and scope of the

What is claimed is:

1. An apparatus for measuring the depth of cells formed in the surface of a material layer comprising:
   an ultrasonic sensing head;
   adjustable mounting means for adjustably mounting said ultrasonic sensing head comprising;
   means for displacing said ultrasonic sensing head at a desired acute angle of substantial magnitude with respect to a perpendicular from said surface of the material layer and
   said adjustable mounting means including a housing having means for maintaining the adjustable mounting means in contact with the surface, and
   said adjustable mounting means comprising a coupling element having a matched abutment surface contacting said material layer surface and including means rotatably mounted in said housing, and being adjustably mounted to said coupling element whereby said coupling element is moved transversely of said perpendicular upon rotation of said means, and
   said coupling element having an additional abutment surface of a predetermined geometric configuration, and including tensioning retainer elements for securing said ultrasonic sensing head to said additional surface of predetermined geometric configuration.

2. Apparatus in accordance with claim 1 in which said abutment surface of predetermined geometric configuration is at least partially spherical.

3. Apparatus in accordance with claim 1 in which said abutment surface of predetermined geometric configuration is at least partially cylindrical.

4. Apparatus in accordance with claim 1 including:
   an intermediate coupling element having means fixedly coupling the ultrasonic sensing head thereto,
   said intermediate coupling element also having an abutment surface matching the additional abutment surface of predetermined geometric configuration of said coupling element, and
   wherein said tensioning retainer elements hold said additional surface of predetermined geometric configuration and said matching abutment surface of said intermediate coupling element in mating relationship.

5. Apparatus in accordance with claim 1 wherein said means for maintaining includes compression spring means, said compression spring means abutting a portion of the housing and biasing said retainer rod means and hence said coupling element against said material layer surface.

6. Apparatus in accordance with claim 5 in which said retainer rod means has an end opposite the coupling element, which end protrudes beyond said housing and includes a gripping element mounted to said end.

7. An apparatus for measuring the depth of cells formed in the surface of a material layer comprising:
   an ultrasonic sensing head,
   adjustable mounting means for mounting said ultrasonic sensing head at a desired angle with respect to said surface of the material layer,
   said adjustable mounting means including a housing having means for maintaining the adjustable mounting means in contact with said surface,
   said adjustable mounting means also including a coupling element having a matched abutment surface for contacting said material layer surface,
   said housing supporting a retainer rod means for biasing said coupling element toward said surface,
   said coupling element having an additional abutment surface of a predetermined geometric configuration, and including tensioning retainer elements for securing said ultrasonic sensing head to said additional surface of predetermined geometric configuration,
   compression spring means,
   said compression spring means abutting a portion of the housing and biasing said retainer rod means to maintain said coupling elements in contact against said material layer surface,
   said retainer rod means being pivotally mounted to said coupling element, said retainer rod having a lower portion in oblique and concentric relation to a perpendicular reference with the material layer surface at the point of impingement of the ultrasonic beam.

8. An apparatus for measuring the depth of cells formed in the surface of a material layer comprising:
   an ultrasonic sensing head,
   adjustable mounting means for adjustably mounting said ultrasonic sensing head for rotation to a desired acute angle of substantial amount with respect to a perpendicular from said surface of the material layer,
   said adjustable mounting means including a housing having means for maintaining the adjustable mounting means in contact with the surface,
   said adjustable mounting means also including further means for adjustably positioning said ultrasonic sensing head transversely of said perpendicular,
   a coupling element having a matched abutment surface contacting said material layer surface, said further means including a retainer rod means adjustably mounting said coupling element for movement transversely of said perpendicular,
   said coupling element having an additional abutment surface of a predetermined geometric configuration, and including tensioning retainer elements for securing said ultrasonic sensing head to said additional surface of predetermined geometric configuration,
   said maintaining means including compression spring means, said compression spring means abutting a portion of the housing and biasing said retainer rod means and hence said coupling element against said material layer surface,
   said retainer rod means having an offset portion, an upper portion rotatably mounted to said housing and a lower portion connected to said coupling element whereby the coupling element is moved transversely of said perpendicular by rotation of said upper portion.

9. Apparatus in accordance with claim 4 in which said tensioning retainer elements are resilient to permit said ultrasonic sensing head and hence said intermediate coupling element to be pivoted on and with abutting contact to the abutment surface of predetermined geometric configuration of said coupling element relative to the point of intersection of the ultrasonic beam with respect to the material layer surface.

10. Apparatus in accordance with claim 9 in which the abutting surfaces of said coupling element and said intermediate coupling element are configured in a manner such that the position of said ultrasonic sensing head may be varied so that the axis of its ultrasonic beam is at least adjustable from an angle of 10° through an angle of 70° with respect to a tangent to the point of intersection of the ultrasonic beam with the material layer surface.

11. Apparatus in accordance with claim 1 including a layer of lubricant provided between the material layer surface and the matched abutment surface of said coupling element.

12. Apparatus in accordance with claim 11 including an additional layer of lubricant provided between said coupling element's abutment surface of desired geometric configuration and said mating abutment surface of said intermediate coupling element.

13. Apparatus in accordance with claim 12 including means for continuously replenishing said layers of lubricant.

14. Apparatus in accordance with claim 7 in which said retainer rod is pivotally mounted in said housing to permit rotation of said retainer rod whereby said coupling element together with the associated ultrasonic sensing head is rotated with respect to the surface of the material layer.

15. Apparatus for measuring the depth of cells formed in a material layer by directing an incident ultrasonic beam therefrom using an ultrasonic beam towards said layer and by detecting a reflected ultrasonic beam therefrom using an ultrasonic sensor, said apparatus comprising:

a mounting structure for positioning said ultrasonic sensor relative to said material layer with respect to at least two degrees of adjustable movement freedom, said mounting structure including angular adjustment means for moving said sensor into a desired angular position with respect to a perpendicular from said material layer at the point where said incident beam impinges upon said layer, said angular adjustment means including ultrasonic transmission members comprising a first member having an upper convex surface and a lower surface conformed to contact the surface of said material layer and a second member disposed between said upper convex surface and said sensor and adapted to slide along said upper convex surface and thus provide adjustable angular positioning of said sensor with respect to said perpendicular, a retainer rod means having a lower end engaging said first member and an upper end rotatably attached to said apparatus, said upper and lower ends of said retainer rod means being offset with respect to one another such that rotation of said upper end provides adjustable positioning of said first member and hence of said sensor in a direction substantially transverse to said perpendicular.

16. Apparatus according to claim 15 wherein tension retainer elements are provided for securing said ultransonic sensing head and said second member to said upper convex surface of said first member.

17. Apparatus according to claim 15 wherein said upper convex surface of said first member is at least partially spherical.

18. Apparatus in accordance with claim 16 in which said convex surface is at least partially cylindrical.

19. Apparatus according to claim 15 wherein compression spring means are provided for biasing said retainer rod means towards said material layer so that said first member is continuously held in contact with said material layer.

20. Apparatus according to claim 15 in which said retainer rod means has an offset portion intermediate said upper and lower ends.

21. Apparatus in accordance with claim 16 in which said tensioning retainer elements are resilient to permit said ultrasonic sensor and hence said second element to be pivoted on and with abutting contact to the upper surface of said first element relative to the point of intersection of the incident ultransonic beam with respect to the material layer surface.

22. Apparatus in accordance with claim 21 in which the abutting surface of said first element and said second element are configured in a manner such that the position of said ultrasonic sensing head may be varied so that the axis of its ultrasonic beam is at least adjustable from an angle of 10° through an angle of 70° with respect to a tangent to the point of intersection of the ultrasonic beam with the material layer surface.

23. Apparatus in accordance with claim 15 including a layer of lubricant provided between the material layer surface and the matched abutment surface of said first element.

24. Apparatus in accordance with claim 23 including an additional layer of lubricant provided between the upper convex surface of said first element and said mating abutment surface of said second element.

* * * * *

UNITED STATES PATENT OFFICE
CERTIFICATE OF CORRECTION

Patent No. 3,938,371                 Dated February 17, 1976

Inventor(s) MAMILIANO DINI

It is certified that error appears in the above-identified patent and that said Letters Patent are hereby corrected as shown below:

Column 7, line 30, delete "therefrom using an ultrasonic beam".

Signed and Sealed this eighth Day of June 1976

[SEAL]

Attest:

RUTH C. MASON
Attesting Officer

C. MARSHALL DANN
Commissioner of Patents and Trademarks